United States Patent [19]
Reichmuth et al.

[11] Patent Number: 5,644,492
[45] Date of Patent: Jul. 1, 1997

[54] METHOD FOR COMPENSATION OF WEIGHING ERRORS IN AN ELECTRONIC SCALE

[75] Inventors: Arthur Reichmuth, Wetzikon; Martin Heusser, Meilen, both of Switzerland

[73] Assignee: Mettler-Toledo GmbH, Greifensee, Switzerland

[21] Appl. No.: 931,118

[22] Filed: Aug. 17, 1992

Related U.S. Application Data

[63] Continuation of Ser. No. 130,865, Dec. 10, 1987, abandoned.

[30] Foreign Application Priority Data

Dec. 16, 1986 [CH] Switzerland ............... 4999/86

[51] Int. Cl.⁶ ........................... G01G 23/01
[52] U.S. Cl. ............... 364/464.25; 364/571.02; 177/25.19; 177/25.12
[58] Field of Search ............ 364/571.01, 571.02, 364/576, 581, 573, 466; 177/25.11, 25.12, 25.18, 25.19, 12, 50

[56] References Cited

U.S. PATENT DOCUMENTS

| | | | |
|---|---|---|---|
| 3,976,150 | 8/1976 | Wilson et al. | 177/16 |
| 4,341,275 | 7/1982 | Stadler et al. | 364/567 |
| 4,375,838 | 3/1983 | Yano et al. | 177/50 |
| 4,535,854 | 8/1985 | Gard et al. | 177/50 |
| 4,625,817 | 12/1986 | Kawashima et la. | 177/25.18 |
| 4,653,600 | 3/1987 | Melcher et al. | 73/1 B |
| 4,660,662 | 4/1987 | Katz | 177/50 |
| 4,660,663 | 4/1987 | Amacher et al. | 364/567 |
| 4,661,920 | 4/1987 | Haze | 364/567 |
| 4,691,290 | 9/1987 | Griften | 364/567 |
| 4,703,815 | 11/1987 | Hirano et al. | 177/50 |
| 4,760,539 | 7/1988 | Amacher et al. | 364/571 |
| 4,774,683 | 9/1988 | Masuyama | 364/567 |

FOREIGN PATENT DOCUMENTS

| | | | |
|---|---|---|---|
| 80301444.8 | 1/1980 | European Pat. Off. . | |
| 44707 | 1/1982 | European Pat. Off. . | |
| 3144103 | 6/1982 | Germany . | |
| 0207011 | 10/1985 | Japan | 364/567 |
| 2088061 | 6/1982 | United Kingdom . | |

Primary Examiner—Vincent N. Trans
Attorney, Agent, or Firm—Pennie & Edmonds LLP

[57] ABSTRACT

Correction coefficients which permit effective linearization of an electronic scale over a measurement range may be determined by loading the scale individually and in combination with loads, at least one of the loads being unknown and uncalibrated.

38 Claims, 6 Drawing Sheets

METHOD FOR COMPENSATION OF WEIGHING ERRORS IN AN ELECTRONIC SCALE

This is a continuation of application Ser. No. 07/130,865, filed Dec. 10, 1987, now abandoned.

TECHNICAL FIELD

The present invention relates generally to electronic scales and, more specifically, to the compensation of nonlinear weighing errors in electronic scales.

BACKGROUND ART

Modern electronic scales produce a weight reading by converting the force of a weight on a weighing pan, weighing platform or other load receiver into an electronic signal. The form of this signal as a function of the weight on the weighing platform often shows deviations from linearity. In such cases the weight displayed by the scale does not agree with the true weight over the entire range of measurement.

In order to check the linearity of electronic scales and correct for nonlinearities, it has been known to place reference weights of precisely known mass on the weighing platform, to compare the weights displayed with the known actual weights and to use the deviations between the known and measured weight values thus found to correct subsequent measurements using the electronics of the scale. However, reference weights of mass known to the precision required for conventional linearization procedures tend to be expensive. Such weights are subject to loss and theft and, if not treated with care, can become altered in mass and uncalibrated. A need for reference weights of precisely known mass for linearizing an electronic scale tends to defeat a principal advantage of electronic scales over conventional dual-pan balances, namely that electronic scales ordinarily do not require a set of precision calibrated weights to make weight measurements, whereas dual-pan balances require such a set of weights.

One example of a conventional nonlinearity correction procedure for electronic scales is disclosed in U.S. Pat. No. 3,976,150, which proposes to place four precisely known weights on an electronic scale one after the other, to store the measured values and then make use of the stored values for the calculation of linearization coefficients.

A similar correction procedure is followed in European patent application No. 0044707. A measured value of a precisely known reference weight is stored. Subsequently the difference between the stored measured weight and the known weight is calculated. The resulting value is then taken into account by a calculator in the scale for correcting the measurement of weights subsequently placed on the scale.

In German published patent application Ser. No. DE-A1-3 144 103 an electronic scale is disclosed which uses a reference weight of 90-100 percent of the maximum load for a calibration procedure. Initially, the magnitude of the reference weight is measured on the scale and stored. In order to carry out a secondary calibration of the scale, the reference weight is again placed on the scale, its weight is measured and the result is compared with the previously stored value. The calibration may then be carried out by certain evaluation electronics of the scale using the difference between the two measured values of the reference weight. Although this calibration apparatus makes possible a precise determination of a single reference point, verification and correction of the linearity of the scale over the entire range of measurement is not accomplished.

SUMMARY OF THE INVENTION

We have invented a process for compensating for nonlinear weighing errors in electronic scales which avoids problems in the prior art noted above.

According to the present invention, correction coefficients which permit effective linearization of a scale over a measurement range may be determined by loading the scale individually and in combination with loads, at least one of the loads being unknown and uncalibrated.

A preferred process of the invention permits compensation for nonlinear weighing errors in an electronic scale. The electronic scale has a load receiver for bearing loads to be weighed. The steps of the process are set forth below.

The process of the invention preferably includes the step of operating the scale to obtain a first base-load indication representative of a load borne by the load receiver of the scale. The load, which may be a zero or nonzero load, defines a first base load.

The process further preferably includes the step of adding a nonzero load to the first base load borne by the load receiver. The added nonzero load defines an offset load. The scale is then operated to obtain a first-base-load-plus-offset indication representative of the combined offset load and first base load borne by the load receiver.

The process of the invention preferably includes the additional step of loading the load receiver of the scale with a second base load. The weight of the second base load differs from the weight of the first base load. The scale is then operated to obtain a second base-load indication representative of the second base load borne by the load receiver.

The process of the invention preferably further includes the step of adding the same offset load to the second base load borne by the load receiver. The scale is then operated to obtain a second-base-load-plus-offset indication representative of the combined offset load and second base load borne by the load receiver.

Subsequently the load receiver of the scale is preferably loaded with an unknown-weight load whose weight is to be determined. The scale is then operated to obtain an unknown-weight indication representative of the unknown-weight load borne by the load receiver.

Finally, the process of the invention preferably includes the step of combining algebraically the first base-load indication, the first base-load-plus-offset indication, the second base-load indication, the second base-load-plus-offset indication and the unknown-weight indication in accordance with a predetermined error-compensation formula to obtain an unknown-weight value representative of the unknown-weight load borne by the load receiver for which nonlinear weighing errors of the scale have been substantially compensated.

An advantage of the linearization process of the invention is that it may be carried out using loads of unknown weight. Of course, the maximum load limit of the scale should not be exceeded. In general the nature of the loads makes no difference. For example, such loads may be objects or goods to be weighed which are stored at the location of the scale. Alternatively, loading may be effected according to the invention by impressing suitable voltages or currents in the measuring circuitry or mechanism of the scale, e.g. in the case of scales with electromagnetic load compensation as described below. Preferably, the base loads are distributed over the load range of the scale to be linearized. More preferably, the base loads are distributed approximately equally over the load range of the scale to be linearized, although, if desired, the base loads may be distributed over the range in a binary, decadic, or other distribution. Preferably, the offset load is less than the difference between the base loads.

Objects used as loads in the process of the invention may be placed externally onto a load receiver of the scale such as a weighing pan or weighing platform. Alternatively, loads may be built into the scale and may be operable manually or with an actuator for loading a load receiver.

Changes of the values of the loads between two linearization processes have no influence on the adjustment. Although the loads (of the objects or the currents, etc.) must remain constant to a high precision during one process of linearization of the scale, such short constancy of the loads may be achieved easily.

The invention will be described below on the basis of examples of preferred embodiments and two drawings.

DETAILED DESCRIPTION OF PREFERRED EMBODIMENTS

Figure 1:
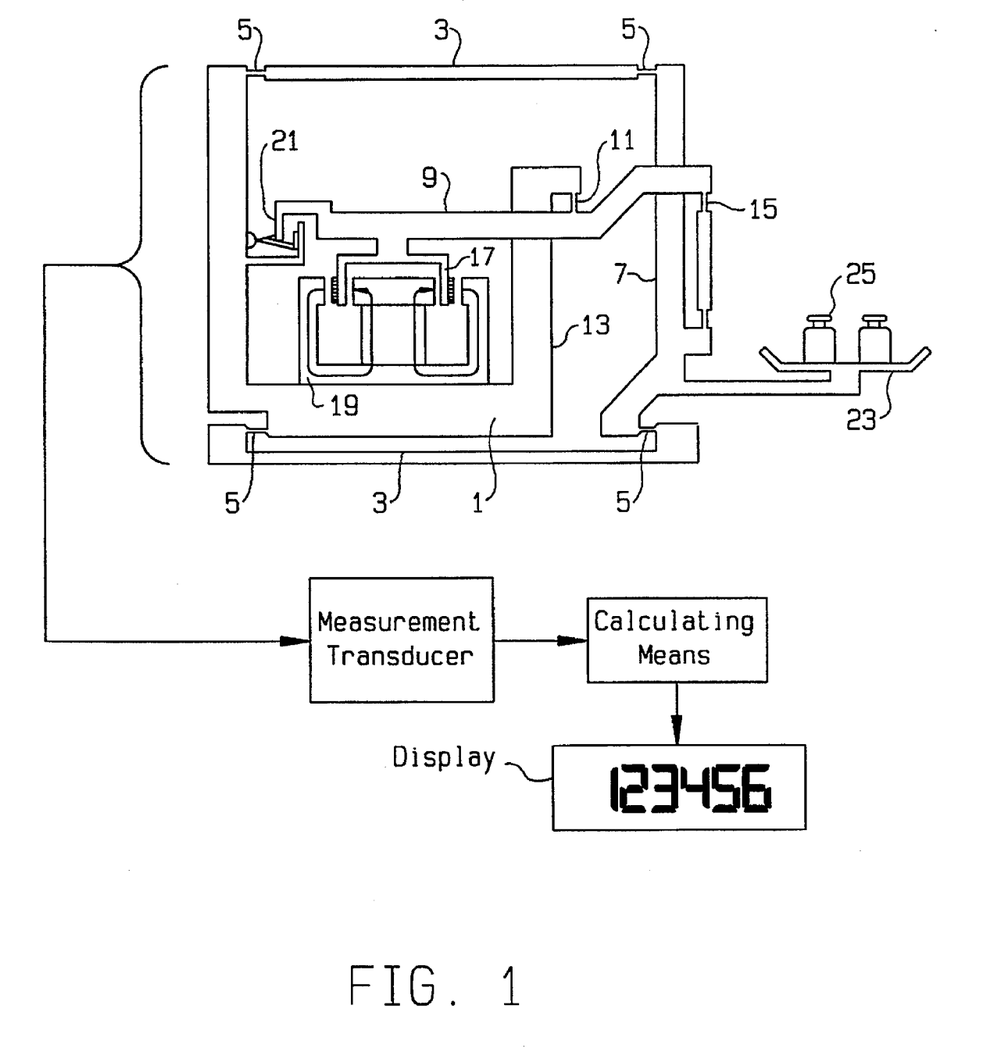
FIG. 1 shows a cross-sectional view of a known electronic scale that can operated according to the present invention.

As shown in FIG. 1, at a scale frame 1 a load receiver assembly 7 is guided in an essentially vertical direction by way of guide links 3 and bending bearings 5. A balance beam 9 is suspended swivelably on a panel 13 by way of a bending bearing 11. At a first end, the balance beam 9 is coupled with the load receiver assembly 7 by way of a bending bearing 15. Close to a second end, the balance beam 9 has a moving coil 17 mounted on it which dips into a locally fixed, permanent magnet system 19 of a known kind. A position transducer 21 is mounted on the scale frame 1 proximate to the second end of the balance beam 9 to detect the position of the end of the beam.

At a lower end of the load receiver assembly 7, a bracket is attached which carries a scale pan 23. Two weights 25 are shown on the scale pan 23 for the purpose of linearization.

For the sake of simplicity, in the following example the nonlinear shape of the correction function $f_L$ for the linearization of the scale is taken to be of the 2nd order (parabolic) and the higher order factors are neglected. The correction function therefore reads:

$$z = f_L(y) := a + by + cy^2 \quad \quad 1)$$

where the coefficients signify: a, the shifting of the zero point; b, the slope; and c, the quadratic portion. The independent variable y represents an uncorrected or raw load measurement indication and the dependent variable z represents a corrected load value. As used throughout this specification, the symbol ":=" means "is defined as" or "is equivalent to".

The scale is linearized using four resultant loads designated $r_1$, $r_2$, $r_3$ and $r_4$. These four resultant loads are in turn made by combining as described below three weights having masses designated $x_0$, $x_1$ and $x_3$. The masses of the three weights need not be known, although for the present example the mass $x_0$ should be nonzero and the mass $x_1$ should differ from the mass $x_3$. The three weights are placed on the load receiver of the scale to be linearized. The following combinations of weights are used to produce the four resultant loads:

$$r_1 = x_1$$

$$r_2 = x_1 + x_0$$

$$r_3 = x_3$$

$$r_4 = x_3 + x_0.$$

The weight of mass $x_1$ is referred to as a first base weight. The weight of mass $x_3$ is referred to as a second base weight. The weight of mass $x_0$ is referred to as an offset weight. The order in which the weights are placed has no significance with regard to the linearization process. Preferably, the first and second base weight fall within the load range of the scale to be linearized to divide the load range into roughly equal intervals. The offset weight $x_0$ is preferably less than the absolute value of the difference between the first base weight and the second base weight. None of the four resultant loads should exceed the maximum load limit of the scale.

Figure 2:
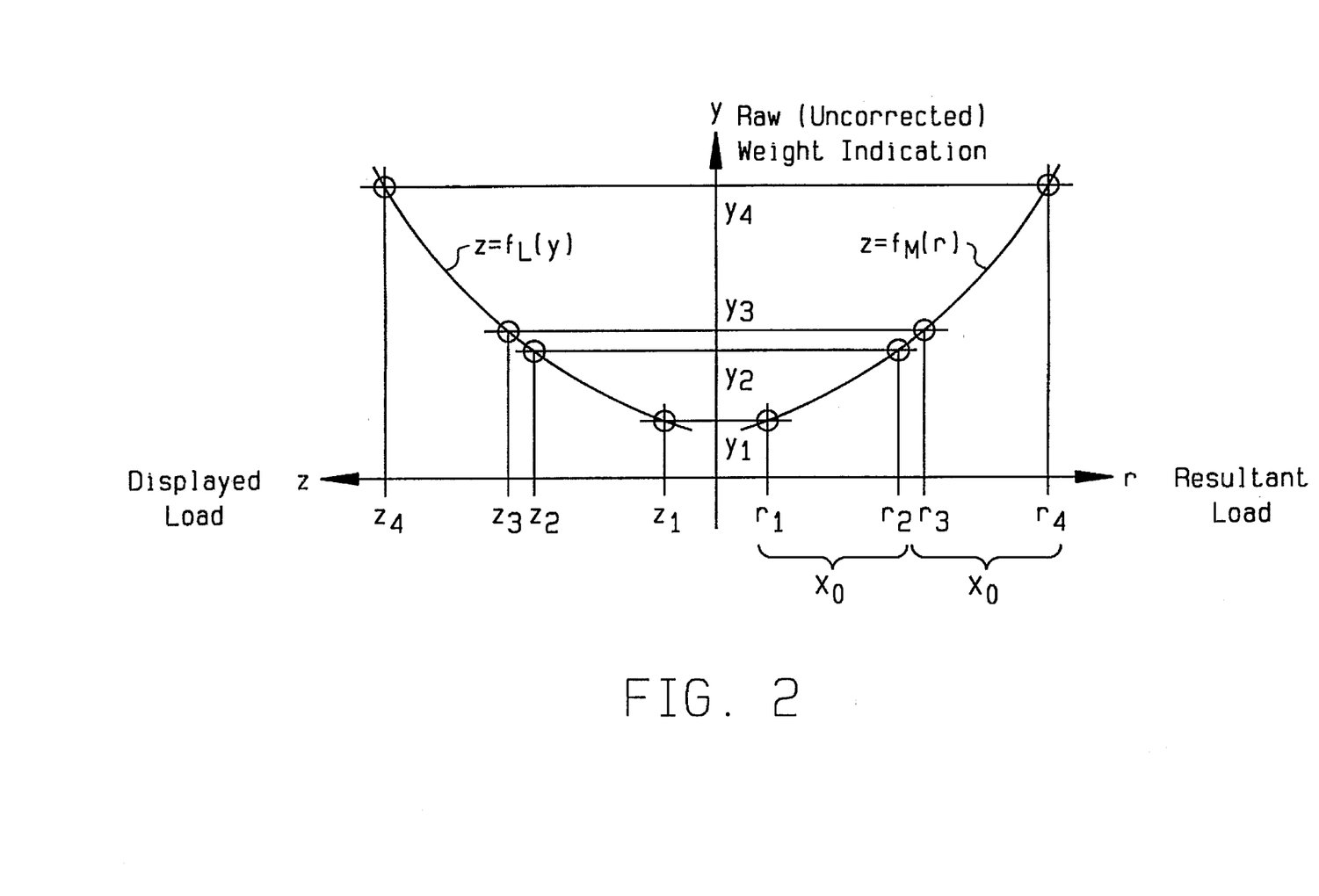
FIG. 2 shows a plot of load, raw measured result, and displayed load.

Graphically illustrated, the measurements of the four resultant loads $r_1 \ldots r_4$ produce a curve $y = f_M(r)$ as shown in FIG. 2, where $f_M(r)$ represents the uncorrected or raw weight indication produced by the scale in response to a resultant load r. In FIG. 2, the resultant load is plotted on the r-axis and the raw weight indication on the y-axis. The z-axis represents the displayed load, which ideally should be identical with the load acting on the measurement transducer.

The raw weight indications $y_1$, $y_2$, $y_3$, $y_4$ produced from the four loads may be combined algebraically to determine coefficients in the correction function $f_L(y)$ defined above. Thus, with the four weighings according to $$z_i = f_L(y_i) := r_i \quad \quad 1)$$

the following equations may be set up:

$$z_1 = a + by_1 + cy_1^2 := r_1 = x_1 \quad \quad 2)$$

$$z_2 = a + by_2 + cy_2^2 := r_2 = x_1 + x_0 \quad \quad 3)$$

$$z_3 = a + by_3 + cy_3^2 := r_3 = x_3 \quad \quad 4)$$

$$z_4 = a + by_4 + cy_4^2 := r_4 = x_3 + x_0. \quad \quad 5)$$

The raw results $y_1 \ldots y_4$ of the pertinent measurements are known; a, b, c, $x_0$, $x_1$, and $x_3$ are unknown.

According to a first embodiment of the invention one starts out from the fact that the four measurements 2) to 5) are carried out and none of the four resultant loads $r_1$, $r_2$, $r_3$, $r_4$ is supposed to be known. The coefficient c may nonetheless be determined as a function of b.

$$3)-2): \quad x_0 = b(y_2 - y_1) + c(y_2^2 - y_1^2) \quad \quad 6)$$

$$5)-4): \quad x_0 = b(y_4 - y_3) + c(y_4^2 - y_3^2) \quad \quad 7)$$

$$7)-6): \quad 0 = b(y_4 - y_3 - y_2 + y_1) + c(y_4^2 - y_3^2 - y_2^2 + y_1^2)$$

$$c = -b \frac{y_4 - y_3 - y_2 + y_1}{y_4^2 - y_3^2 - y_2^2 + y_1^2} \quad \quad 8)$$

from which a linear reading value may be determined with 1)

$$z = a + b\left(y - \frac{y_4 - y_3 - y_2 + y_1}{y_4^2 - y_3^2 - y_2^2 + y_1^2} y^2\right) := a + by^*, \quad 9)$$

where $$y^* = f(y) = y\left[1 - \frac{y_4 - y_3 - y_2 + y_1}{y_4^2 - y_3^2 - y_2^2 + y_1^2} y\right]. \quad 10)$$

Figure 3A:
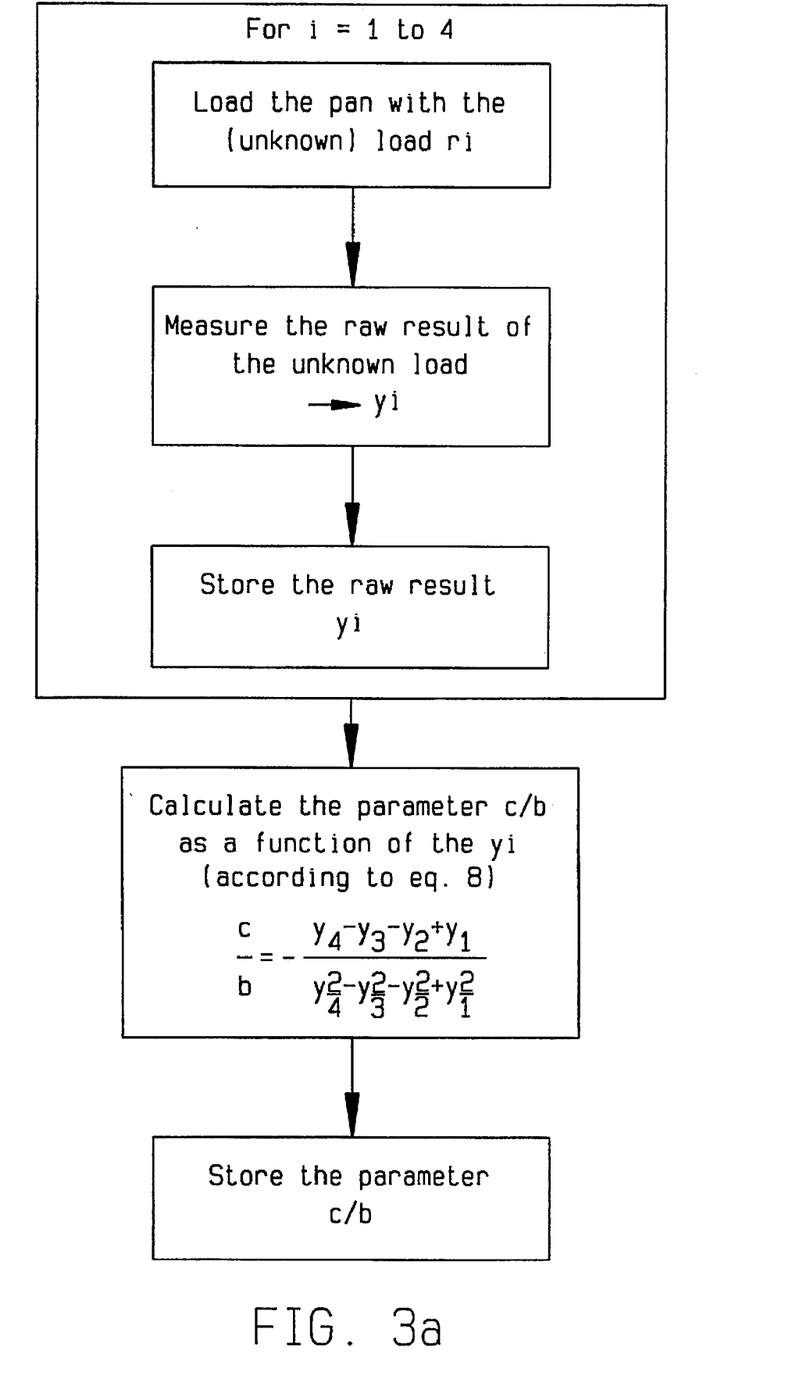
FIGS. 3a and 3b are flowcharts of the linerization process according to a first embodiment of the present invention.
Figure 3B:
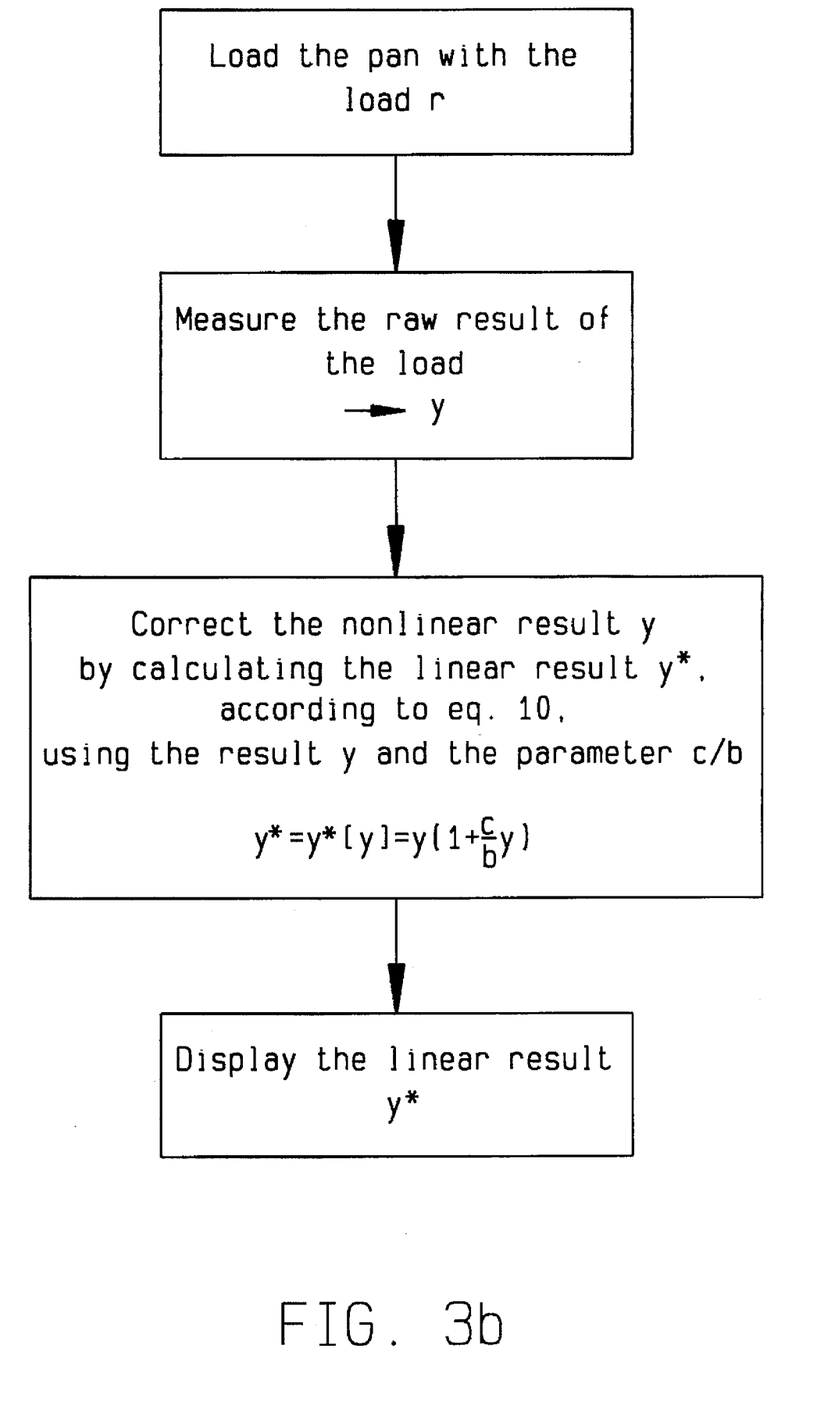

FIGS. 3a and 3b are flowcharts of the linearization process according to this first embodiment. FIG. 3a depicts the parameter calculation for the linearization process, and FIG. 3b depicts the linearization of the raw result.

According to a second embodiment of the invention, one starts out from the fact that the offset weight $x_0$ is known. Then the coefficients c and b can be determined directly from 6) and 7):

$$c = \frac{x_0(-y_4 + y_3 + y_2 - y_1)}{(y_4 - y_3)(y_2 - y_1)(y_4 + y_3 - y_2 - y_1)} \quad 11)$$

$$b = \frac{x_0(y_4^2 - y_3^2 - y_2^2 + y_1^2)}{(y_4 - y_3)(y_2 - y_1)(y_4 + y_3 - y_2 - y_1)}. \quad 12)$$

Figure 4A:
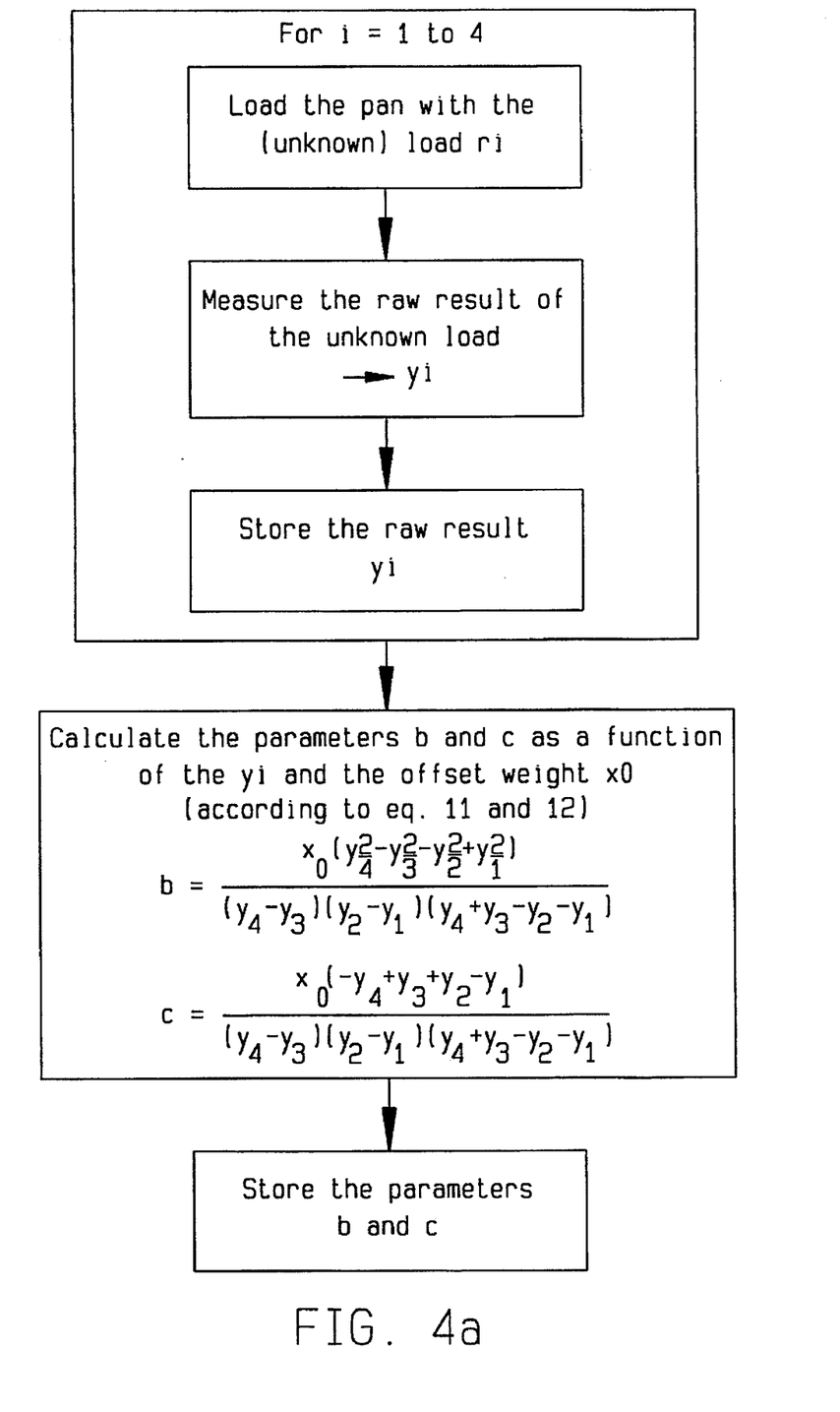
FIGS. 4a and 4b are flowcharts of the linearization process according to a second embodiment of the present invention.
Figure 4B:
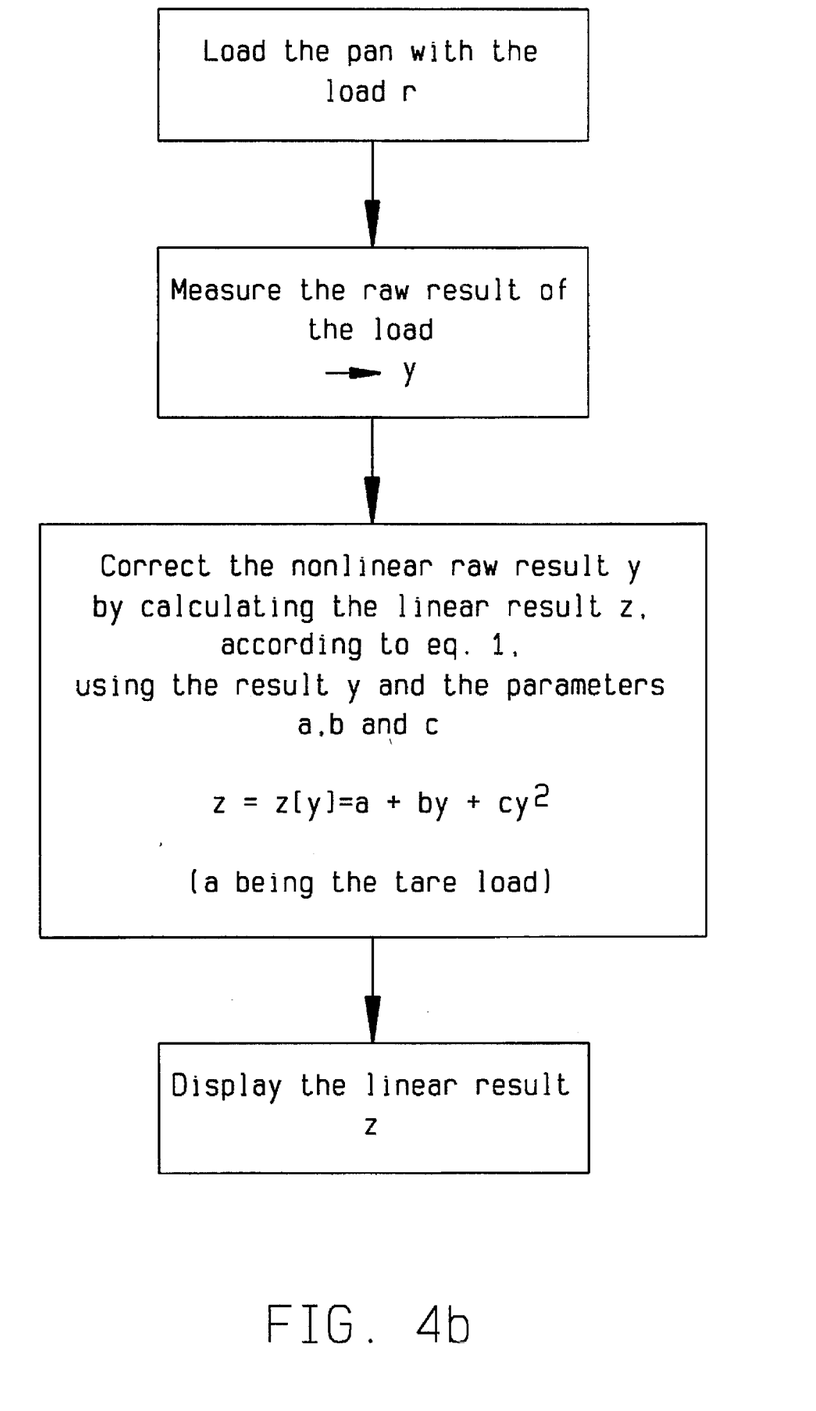

FIGS. 4a and 4b are flowcharts of the linearization process according to this second embodiment. FIG. 4a depicts the parameter calculation for the linearization process, and FIG. 4b depicts the linearization of the raw results.

Numerical example:

Assume the linearization function $$z = f_L(y) = a + by + cy^2 \quad 1)$$

has the following coefficients:

$a = -0.1,$ $b = 1$ $c = 0.1$ then the measured nonlinear raw results $y_i$ belonging to the loads $r_i$ ($=z_i$) are as listed in the following table:

| Load | Raw Result |
|---|---|
| $r_1 = 0.1$ | $y_1 = 0.196152423$ |
| $r_2 = 0.5$ | $y_2 = 0.567764363$ |
| $r_3 = 0.6$ | $y_3 = 0.656854250$ |
| $r_4 = 1$ | $y_4 = 1.000000000$. |

(i.e., $x_0 = 0.4$)

From these measured raw results $y_1 \ldots y_4$, the coefficients of the linearization polynomial can be calculated. The latter are designated $c_b$, $b_b$, and $a_b$ and they represent the values calculated from the assumed data.

According to the first embodiment of the invention:

Let us assume that only the uncorrected weight indications $y_1 \ldots y_4$ are known.

$$8): c_b = -b\frac{-0.028466190}{0.284661896} = (0.100000001)b$$

With this, the linearized raw result may be determined.

13): 
$y^*$ = $y[1 - (-0.100000001)y]$
$y_1^*$ = $0.196152423[1 - (-0.100000001)(0.196152423)]$
   = $0.2$
$y_2^*$ = $0.567764363[1 - (-0.100000001)(0.567764363)]$
   = $0.6$
$y_3^*$ = $0.656854250[1 - (-0.100000001)(0.656854250)]$
   = $0.7$
$y_4^*$ = $1[1 - (0.100000001) 1] = 1.100000001$.

Now a linear signal is present.

In the case in which the difference $r_4 - r_1 = 0.9$ is known, it will additionally be possible to determine from 7) [page 8] and 9) $b_b$:

$$b_b = \frac{r_4 - r_1}{y_4^* - y_1^*} =$$

$$b_b = \frac{0.9}{1.100000001 - 0.2} = 0.999999999 = b - 10^{-9};$$

and in the case $r_1$ is known, for example:

$r_1 = 0.1$ the constant $a_b$ can also be determined:

$a_b = c_1 - b_b \cdot y_1 = a_b = 0.1 - (0.999999999)0.2 = -0.1 = a.$

The difference between the calculated and the previously given coefficients, here as well as further below, result from the limited precision of calculation.

According to the second embodiment of the invention:

Besides $y_1 \ldots y_4$, let the offset weight $x_0 = r_2 - r_1 = r_4 - r_3 = 0.4$ also be known.

$$11): c_b = 0.4\left(\frac{0.028466190}{0.113864758}\right) = 0.100000001 = c + 10^{-9}$$

$$12): b_b = 0.4\left(\frac{0.284661896}{0.113864758}\right) = 0.999999999 = b - 10^{-9}$$

In case that in addition, for example, the first base weight $x_1$ is known, the coefficient a may also be determined from 2):

$a_b = x_1 - (b_b \cdot y_1 + c_b \cdot y_1^2) = a_b = 0.1 - (0.200000000) = -0.1 = a$ In the case of the practical execution of the process explained above on the basis of two examples, the loads are preferably selected in such a way that the smallest one does not fall below the measuring range, the largest one does not exceed it and the loads otherwise are distributed over the entire measuring range.

Whenever the measuring system is loaded with any given unknown but constant preload $x_s$, for example with a system load which may also act in a relieving manner, or an additional load on the load receiver, then the resultant loads change as follows:

$r_1 \to r_1' = x_s + x_1$ $r_2 \to r_2' = x_s + x_1 + x_0$ $r_3 \to r_3' = x_s = x_3$ $r_4 \to r_4' = x_s + x_3 + x_0.$

Whenever one inserts these new load values into the equations 2) . . . 5) instead of the old ones and subsequently determines the differences (equations 6) and 7)), it becomes clear immediately that the preload $x_s$ has no influence either on the course of the calculations or on the result.

The expenditure for the production of the four states of load may be further reduced whenever one chooses $x_1=0$, that is to say whenever the weight $x_1$ is completely omitted. For, even with the two remaining nonzero weights $x_0$ and $x_3$, all four states of resultant loads may be combined:

$r_1 = 0$ $r_2 = x_0$ $r_3 = x_3$ $r_4 = x_3 + x_0.$

Instead of weights, in all cases currents or voltages may also be used as component loads $x_i$ for the production of the states of resultant loads.

If one assumes the linearity error has a curve of a higher order than quadratic, the procedure for the calculation of the correction coefficients is analogous to that of the 2nd order. For example, in the case of a curve of the 3rd order $z = f_L(y) := a + by + cy^2 + dy^3$ by the use of third unknown load together with the offset-weight load $x_0$ at least two additional measurements may be carried out with which two further equations may be obtained with two additional unknowns. With the six equations, the correction coefficients may be calculated analogously to the preceding procedure.

With a polynomial formulation of the n-th order, 2n measurements of the above described type are necessary in order to be able to carry out the linearization process without the value of a load having to be known.

Instead of the polynomial formulation of the type described above, any other suitable function may be used as formulation for the linearization. Thus, for example, a piece-wise distribution of straight lines may be used. It is also possible to use the method of the splines, which connects polynomials of a low degree together without a cusp to form the correction function (cf. for example: Ahlberg, J. H.; Nilson, E. N.; Walsh, J. L.: *Theory of Splines and Their Applications*, Academic Press, New York [1967]). In the case of all methods of correction, it is essential that from the raw results obtained as a result of the loads—as well as from any possibly-present knowledge concerning the loads—relations between correction parameters be determinable. Suitable correction parameters may be, for example, the coefficients of a polynomial or the slopes and zero point shiftings of straight lines in the case of a piece wise distribution in straight lines, etc.

The gradation of the components of the weights or loads $x_1, x_3 \ldots$ etc. may vary in a wide range: e.g., they may be graduated dually or decadically in order to produce resultant loads X with a given number of components of the loads $x_i$.

We claim:

1. A process for compensating for nonlinear weighing errors in an electronic scale, the electronic scale having a load receiver for bearing loads to be weighed, comprising the steps of:

(a) operating the scale to obtain a series of indications representative of at least four different loads, at least two loads being offset the same amount from two other loads;

(b) determining correction parameters from the indications; and (c) using the correction parameters to linearize the electronic scale.

2. The process according to claim 1 in which the error-compensation formula is a polynomial of at least the 2nd order.

3. The process according to claim 1 in which the first of the four different loads is a zero load.

4. The process according to claim 1 in which each of the four different loads is representative of a weight of nonzero mass.

5. The process of claim 1 wherein the offset amount is known.

6. The process of claim 1 wherein the offset amount is unknown.

7. The process of claim 1 wherein each of the four different loads is unknown.

8. A process for compensating for nonlinear weighing errors in an electronic scale, the electronic scale having a load receiver for bearing loads to be weighed, comprising the steps of:

(a) operating the scale to obtain a series of indications representative of at least four different loads borne by the load receiver of the scale, two of said loads being offset the same amount from the other two loads;

(b) loading the load receiver of the scale with an unknown-weight load whose weight is to be determined;

(c) operating the scale to obtain an unknown-weight indication representative of the unknown-weight load borne by the load receiver; and (d) algebraically combining the indications representative of at least four different loads and the unknown-weight indication in accordance with a predetermined error-compensation formula to obtain an unknown-weight value representative of the unknown-weight load borne by the load receiver for which weighing errors of the scale have been substantially compensated.

9. The process according to claim 8 in which the error-compensation formula is a polynomial of at least the 2nd order.

10. The process according to claim 8 in which the first of the four different loads is a zero load.

11. The process according to claim 8 in which each of the four different loads is representative of a weight of nonzero mass.

12. The process of claim 8 wherein the offset amount is known.

13. The process of claim 8 wherein the offset amount is unknown.

14. The process of claim 8 wherein each of the four different loads is unknown.

15. A process for the linearization of an electronic scale using a plurality of loads, at least one of the loads being unknown and uncalibrated, comprising the steps of:

(a) operating the scale to make a series of weighings, some with an individual load and some with a combination of loads, at least one of the loads being unknown and uncalibrated;

(b) determining correction parameters from the weighings; and (c) using the correction parameters to linearize the electronic scale.

16. The process as in claim 15 wherein two or more unknown loads are used in a series of weighings for determining a correction function and wherein step (c) comprises using the calculated correction parameters for calculating a displayed load.

17. The process as in claim 15 wherein one or more unknown loads are used in a series of weighings for determining a correction function and wherein step (c) comprises using the calculated correction parameters for calculating a displayed load.

18. The process as in claim 16 or claim 17 wherein the correction function is composed of piecewise straight lines.

19. The process as in claim 16 or claim 17 wherein the correction function is composed of a polynomial.

20. The process as in claim 16 or claim 17 wherein the correction function is composed of splines.

21. The process as in claim 15, claim 16, or claim 17 wherein at least one of the loads is a weight.

22. The process as in claim 15, claim 16, or claim 17 wherein at least one of the loads is an electric current representing a weight.

23. The process as in claim 15, claim 16, or claim 17 wherein at least one of the loads is an electric voltage representing a weight.

24. The process as in claim 15 wherein step (a) comprises weighing:

a first load;

a second load consisting of the first load and an offset load;

a third load; and a fourth load consisting of the third load and the offset load.

25. The process as claimed in claim 24 wherein the first load is zero.

26. The process as claimed in claim 25 wherein the second and third loads are nonzero.

27. The process of claim 24 wherein the offset load is known.

28. The process of claim 24 wherein at least one of the first load, the third load and the offset load is unknown.

29. The process of claim 24 wherein each of the first load, the third load and the offset load is unknown.

30. A process for compensating for nonlinear weighing errors in an electronic scale, the electronic scale having a load receiver for bearing loads to be weighed, comprising the steps of:

(a) operating the scale to obtain a first base-load indication representative of a zero or nonzero load borne by the load receiver of the scale, the zero or nonzero load borne by the load receiver defining a first base load;

(b) adding a nonzero load to the first base load borne by the load receiver, the added nonzero load defining an offset load;

(c) operating the scale to obtain a first-base-load-plus-offset indication representative of the combined offset load and first base load borne by the load receiver;

(d) loading the load receiver of the scale with a second base load, the second base load differing from the first base load;

(e) operating the scale to obtain a second base-load indication representative of the second base load borne by the load receiver;

(f) adding the offset load to the second base load borne by the load receiver;

(g) operating the scale to obtain a second-base-load-plus-offset indication representative of the combined offset load and second base load borne by the load receiver;

(h) loading the load receiver of the scale with an unknown-weight load whose weight is to be determined;

(i) operating the scale to obtain an unknown-weight indication representative of the unknown-weight load borne by the load receiver; and (j) algebraically combining the first base-load indication, the first base-load-plus-offset indication, the second base-load indication, the second base-load-plus-offset indication and the unknown-weight indication in accordance with a predetermined error-compensation formula to obtain an unknown-weight value representative of the unknown-weight load borne by the load receiver for which nonlinear weighing errors of the scale have been substantially compensated.

31. The process according to claim 30 in which the error-compensation formula is a polynomial of at least the 2nd order.

32. The process according to claim 30 in which the first base load is a zero load.

33. The process according to claim 32 in which the second base load is a weight of nonzero mass and the offset load is a weight of nonzero mass.

34. The process according to claim 30 in which each of the first base load, the second base load, and the offset load is a weight of nonzero mass.

35. The process according to claim 30 in which the first base-load indication is designated $y_1$, the first-base-load-plus-offset indication is designated $y_2$, the second-base-load indication is designated $y_3$, and the second-base-load-plus-offset indication is designated $y_4$, the unknown-weight indication is designated $y$, and the unknown-weight value is designated $y^*$, and the first base-load indication, the first base-load-plus-offset indication, the second base-load indication, the second base-load-plus-offset indication and the unknown-weight indication are combined algebraically to obtain the unknown-weight value in accordance with the following error-compensation formula:

$$y^* = y\left[1 - \frac{y_4 - y_3 - y_2 + y_1}{y_4^2 - y_3^2 - y_2^2 + y_1^2}y\right].$$

36. The process of claim 30 wherein the offset load is known.

37. The process of claim 30 wherein at least one of the first base load, second base load and offset load is unknown.

38. The process of claim 30 wherein each of the first base load, second base load and offset load is unknown.

* * * * *